United States Patent
Kowalewski et al.

(10) Patent No.: US 7,280,583 B1
(45) Date of Patent: Oct. 9, 2007

(54) METHOD OF TRANSMITTING DATA SIGNALS BETWEEN A MASTER STATION AND A PLURALITY OF SLAVE STATIONS, MASTER STATION AND SLAVE STATION

(75) Inventors: Frank Kowalewski, Salzgitter (DE); Peter Mangold, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 1088 days.

(21) Appl. No.: 10/168,587

(22) PCT Filed: Nov. 18, 2000

(86) PCT No.: PCT/DE00/04081

§ 371 (c)(1),
(2), (4) Date: Oct. 24, 2002

(87) PCT Pub. No.: WO01/47139

PCT Pub. Date: Jun. 28, 2001

(30) Foreign Application Priority Data

Dec. 21, 1999 (DE) .............................. 199 61 594

(51) Int. Cl.
*H04B 1/00* (2006.01)
(52) U.S. Cl. ..................................... 375/144
(58) Field of Classification Search ............... 375/130, 375/140, 141, 144
See application file for complete search history.

(56) References Cited

U.S. PATENT DOCUMENTS 6,438,118 B1 * 8/2002 Matui .......................... 370/335
6,680,967 B1 * 1/2004 Westman .................... 375/148
7,149,200 B1 * 12/2006 Vadgama .................... 370/335

FOREIGN PATENT DOCUMENTS

DE 198 18 215 11/1999

OTHER PUBLICATIONS

Povey et al., "TDD-CDMA Extension to FDD-CDMA Based Third Generation Cellular System," IEEE Bd. Conf. 6, Oct. 12-16, 1997.
Ji-Bing Wang et al., "A Novel Multipath Diversity Scheme in TDD-CDMA Systems," 1999 IEEE Radio and Wireless Conf., Aug. 1-4, 1999.
Ji-Bing Wang et al., "Novel Multiuser Interference Canceling Scheme in the Downlink of TDD-CDMA systems," 5th Asia-Pacific Conf. On Communications and Fourth Optoelectronics and Communications Conf. 1999.
Esmailzadeh et al., "PreRAKE Diversity Combining in Time-Division Duplex CDMA Mobile Communications," IEEE Transactions on Vehicular Technology, May 1999.

* cited by examiner

*Primary Examiner*—Pankaj Kumar
(74) *Attorney, Agent, or Firm*—Kenyon & Kenyon LLP

(57) ABSTRACT

A method for transmission of data signals between a master station and multiple slave stations, as well as a master station and a slave station are provided, permitting distortion of predistorted data signals. Data signals are transmitted between the master station and multiple slave stations via wireless channels, data signals for different slave stations being spread using different codes in the master station, a predistortion of the data signals to be transmitted being performed, and in predistortion the transmission properties of all wireless channels and the different codes are considered. The data signals to be transmitted are predistorted by filtering in the master station.

42 Claims, 3 Drawing Sheets

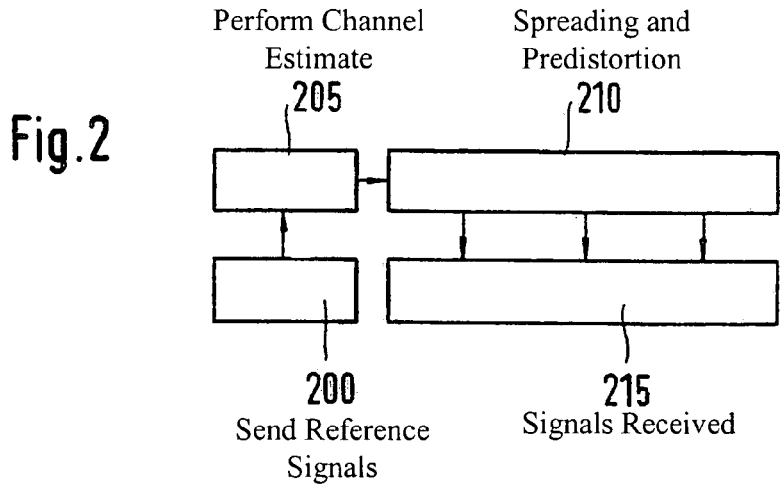
Fig.2
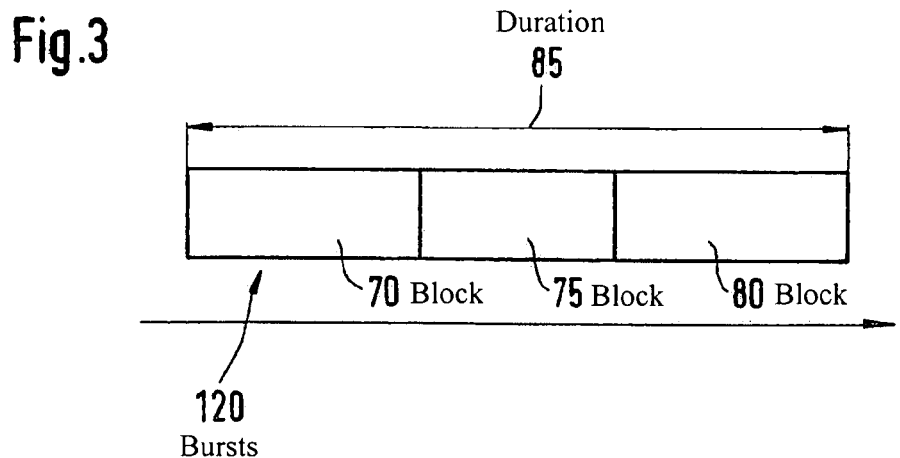
Fig.3
Fig.4

METHOD OF TRANSMITTING DATA SIGNALS BETWEEN A MASTER STATION AND A PLURALITY OF SLAVE STATIONS, MASTER STATION AND SLAVE STATION

FIELD OF THE INVENTION

The present invention relates to a method of transmitting data signals between a master station and multiple slave stations and to a master station and slave station.

BACKGROUND INFORMATION

German Published Patent Application No. 198 18 215 refers to a method of transmitting signals between a base station and multiple mobile stations over wireless channels, the data of different mobile stations being spread using different codes. A modulator performs predistortion of the signals to be transmitted. In predistortion, the transmission properties of the wireless channels and the different codes may be considered.

SUMMARY OF THE INVENTION

It is believed that an exemplary method according to the present invention, an exemplary master station according to the present invention and an exemplary slave station according to the present invention have an advantage in that the data signals to be transmitted are predistorted in the master station by filtering. Predistortion thus represents a portion of the transmission channel from the master station to the slave station, so that the slave station may distort the predistorted data signals to be transmitted. Thus, through distortion in the slave station, a faulty predistortion, which may no longer be capable of rapidly following the changes in the properties of the transmission channel, may be compensated for, for example, when the properties of the transmission channel rapidly change.

It is believed to be advantageous in that reference signals are transmitted to the various slave stations, at least with a portion of the data signals, the reference signals being filtered before being transmitted in the same manner as the data signals. In this manner, reference signals may be transmitted from the master station to the corresponding slave station with the same predistortion as the data signals, so that the corresponding slave station may perform a channel estimate on the basis of the received reference signals, considering the predistortion. In this manner, a postdistortion may be implemented in the slave station, for example, when rapid channel changes exist, when the predistortion in the master station is no longer completely adapted to the new channel properties.

It is believed to be advantageous in that the data signals and the reference signals are predistorted through a common filter. In this manner, the same predistortion for the data signals and the reference signals may be ensured, or at least made more probable, while eliminating the effort and time required for predistortion, since separate predistortion for the reference signals may not be necessary.

It is also believed to be advantageous in that a separate reference signal is transmitted for a first slave station. In this manner, the reference signal assigned to the wireless channel from the master station to the first slave station may be detected through correlation reception from the reference signals received by the first slave station, so that the slave station may synchronize to this reference signal. The RF transmission properties in the reverse transmission path from the slave station to the master station may also be considered for synchronization, on the basis of the predistortion of the reference signal, based on the channel estimate of the reverse transmission path.

It is also believed to be advantageous in that at least some of the data signals are shortened by at least one component after being filtered and before being transmitted. This may prevent interference between successive bursts in transmission of data signals.

It is also believed to be advantageous in that the first slave station performs a check to determine whether the data signals have been received via several routes. If so, a method for distortion and despreading of the received data signals, for example, by a RAKE receiver, or a joint detection method may be used. Otherwise, the data detection is performed only by despreading, for example, by using a second correlation receiver. In this manner, data detection may be adapted in the corresponding slave station, even on reception of signals already predistorted in the master station, to different properties of the wireless channel, which may change over time from the master station to the corresponding slave station, for example, if the predistortion is no longer up-to-date because of rapid changes in these properties. In this case, the detection may be more complex and expanded by including distortion, so that reception quality is not sacrificed at the corresponding slave station.

Due to the check for multi-way reception in the first slave station, the master station need not signal to indicate which type of data detection is to be performed in the first slave station.

BRIEF DESCRIPTION OF THE DRAWINGS

FIG. 2 is a flow chart of an exemplary method according to the present invention.

FIG. 3 shows the build-up of a burst over time.

FIG. 4 is a power-time diagram for analysis of the wireless channel from the master station to the slave station.

DETAILED DESCRIPTION

Figure 5:
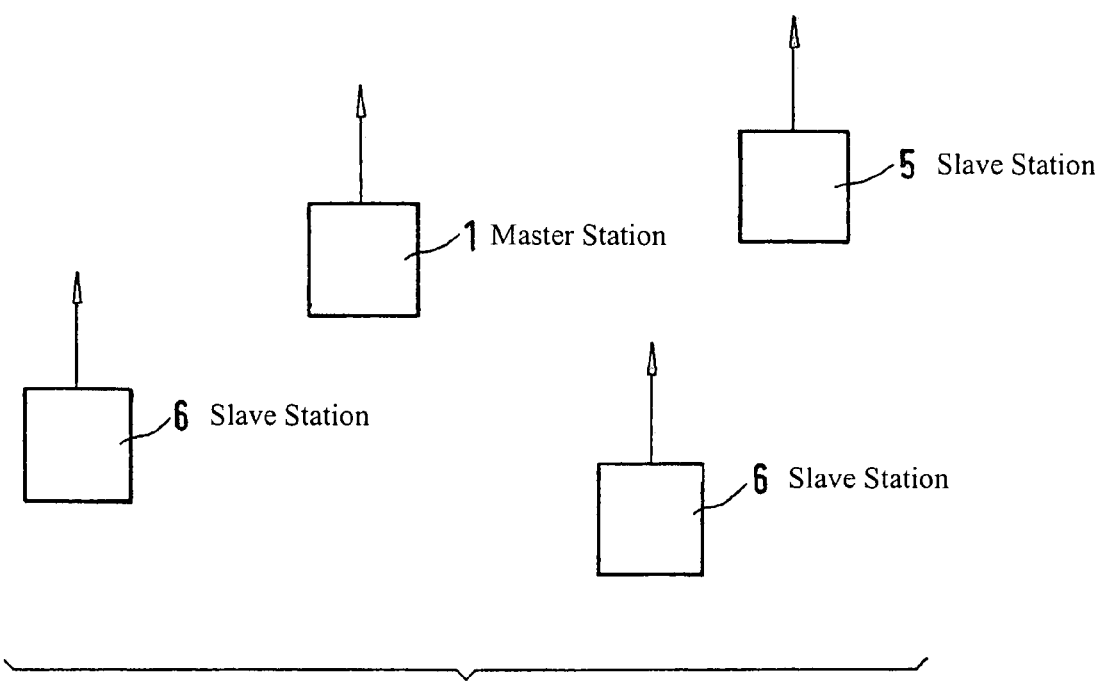
FIG. 5 shows the general structure of a mobile wireless system.

FIG. 5 is a schematic of a wireless cell of a cellular mobile telephone system or mobile wireless system having a master station 1 (i.e., central station) designed as a base station, a first slave station 5 designed as a mobile station and other slave stations 6, which are also designed as mobile stations. An exchange of data occurs only between base station 1 and mobile stations 5, 6 (i.e., peripheral stations), and direct data exchange between mobile stations 5 and 6 is impossible. Data exchange between base station 1 and mobile stations 5, 6 occurs by wireless transmission. Wireless transmission from base station 1 to one of mobile stations 5, 6 is a "downlink" and data transmission from one of mobile stations 5, 6 to base station 1 is an "uplink." In the system of FIG. 5, having a central station or base station 1 and multiple peripheral or mobile stations 5, 6, how the data for various mobile stations 5, 6 is modulated should be defined, so that the data may be detected separately in the receivers of different mobile stations 5, 6. An exemplary system according to FIG. 5 is a CDMA (Code Division Multiple Access) system, in which a common frequency band is available for data transmission, the individual wireless channels between base station 1 and respective mobile stations 5, 6 differing by a code, with which the signal for corresponding mobile stations 5, 6 is spread. The case in which multiple mobile stations 5, 6 and base station 1 are provided in the wireless cell is described below. By spreading using this code, each signal to be exchanged between base station 1 and a certain mobile station 5, 6 is distributed over the entire available spectrum. Each individual information bit to be transmitted is broken into a plurality of small "chips." In this manner, the energy of one bit is distributed over the entire frequency spectrum available to the CDMA system. A CDMA system is illustrated in FIG. 2 as a downlink transmission.

Figure 1:
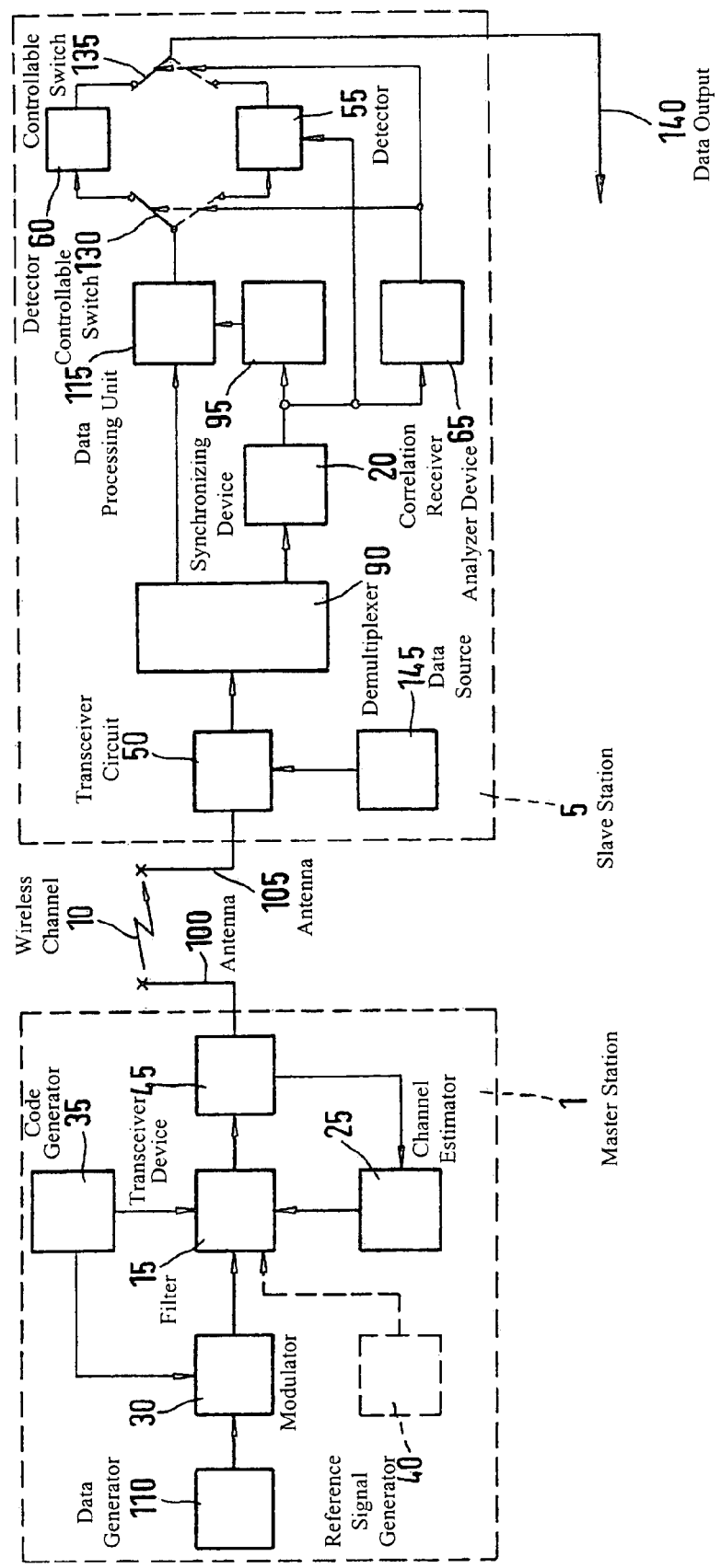
FIG. 1 is a block diagram of an exemplary master station according to the present invention and an exemplary slave station according to the present invention.

FIG. 1 shows a master station 1 as a base station and a first slave station 5 as a mobile station. Base station 1 includes a first antenna 100. First slave station 5 includes a second antenna 105. Base station 1 and first slave station 5 exchange data over a first wireless channel 10 in the downlink transmission direction from base station 1 to first slave station 5 and a second wireless channel (not shown) in uplink transmission from first slave station 5 to master station 1. First wireless channel 10 describes a transmission link from first antenna 100 to second antenna 105. The second wireless channel describes a transmission link from second antenna 105 to first antenna 100. Base station 1 includes a data generator 110 (i.e., a data source), which generates data streams. The data streams are sent to a modulator 30 of base station 1, which processes the data streams from data source 110 for transmission over first wireless channel 10. For this purpose, modulator 30 requires code information, which is provided by a code generator 35. Modulator 30 generates a data signal from the data streams and the code information, this data signal being spread using the code information. Then, the data signal is sent to a filter 15 of base station 1. Modulator 30 spreads data streams for various slave stations using different codes. Filter 15 performs a predistortion of the data streams, considering the transmission properties of all the wireless channels and all the different codes. Code generator 35 considers the different codes via the code information. For this purpose, the code generator 35 is connected to filter 15. A channel estimator 25 considers the transmission properties of the wireless channels. The channel estimator 25 estimates the wireless channels in the uplink transmission direction from individual slave stations 5, 6 to base station 1, for example, when the wireless channels in the uplink and in the downlink are implemented according to a time division duplex TDD operation. In this case, transmission properties of wireless channels between base station 1 and a corresponding slave station may be similar in uplink and downlink.

Channel estimator 25 is connected to a first transceiver device 45, to which first antenna 100 is connected as a transmitting/receiving antenna and from which the channel estimator 25 receives reference signals from individual slave stations 5, 6 to determine the transmission properties in the respective uplink. The channel estimator 25 uses these reference signals as an estimate of the transmission properties for the respective downlink (i.e., first wireless channel 10) in the exemplary embodiment according to the present invention described above with reference to FIG. 1.

Filter 15 may be a linear filter, and base station 1 may have such a filter for each slave station 5, 6 in the wireless cell of base station 1. The various CDMA-coded component signals for individual slave stations 5, 6 contained in the total signal encoded by modulator 30 are filtered differently. FIG. 1 shows an exemplary filter 15 for first slave station 5.

As indicated with broken lines in FIG. 1, base station 1 may include a reference signal generator 40, which generates a reference signal for one or more slave stations 5, 6. This signal is filtered by filter 15 in a similar manner as the data signals provided for respective slave station 5, 6. The reference signals are sent from reference signal generator 40 to filter 15, so that data signals and reference signals are predistorted by filter 15.

As shown in FIG. 3, data signals and reference signals are transmitted from base station 1 to first slave station 15 as bursts 120 of duration 85 on time axis t. Bursts 120, in which reference signals are to be transmitted, are divided into a first block 70, a second block 75, and a third block 80, the middle second block 85 including the reference signals and two other blocks 70, 80 including the data signals. Burst 120 is formed at the input of filter 15. Filter 15 may then perform the predistortion either in blocks, so that blocks 70, 75, 80 of bursts 120 are predistorted separately, or in bursts, so that blocks 70, 75, 80 are predistorted together. Reference signal generator 40 may generate a separate reference signal for each slave station and also for first slave station 5 in the wireless cell of base station 1. This reference signal is known in the corresponding slave station and is inserted as a second data block 75 into one of bursts 120 to be transmitted to the corresponding slave station, before being filtered in filter 15. A reference signal need not be inserted into each burst 120. Bursts 120, formed in this manner, are predistorted in the respective filters for individual slave stations 5, 6, as described above, with the predistortion for first slave station 5 occurring in filter 15, as described above with reference to FIG. 1. Bursts 120, predistorted in this manner, are then relayed from filter 15 (or from the filters) to transceiver device 45. From the transceiver device 45, bursts 120 are sent over first antenna 100 and corresponding wireless channels in the downlink to the corresponding slave stations. For example, bursts 120 of first slave station 5 are sent via first wireless channel 10.

Transceiver device 45 may shorten at least a portion of the data signals and/or the reference signals to be sent to the respective slave station by removing one or more components after filtering. This shortening operation may be, at most, the length of the data signals or reference signals before filtering.

Modulator 30 generates a transmission signal from the data streams and the code information. This transmission signal is sent to first slave station 5 and additional slave stations 6 after filtering in the respective filter. For exemplary purposes only, FIG. 1 shows first slave station 5 as the receiving mobile station. If only first slave station 5 is provided as the receiving mobile station in the wireless cell to be supplied with a single data stream, only one code information is needed in base station 1. However, base station 1 usually transmits to the other slave stations 6 (not shown in FIG. 1) simultaneously over corresponding wireless channels, the respective data of the other slave stations 6 likewise being modulated with different codes.

Code generator 35 generates codes as a function of the selected wireless connections to slave stations 5, 6, and modulator 30 spreads the data to be transmitted with the signals using these codes.

Various types of interference may occur in transmission between base station 1 and first slave station 5, such as ISI (inter-symbol interference), which results from a transmitted wireless signal arriving at the receiver via several different paths. In this case, the arrival times of the signal via the several different paths differ slightly. ISI may occur in a respective wireless channel because signals transmitted previously may interfere with signals being received at the present time (therefore, inter-symbol interference). Another type of interference may occur because multiple data streams may be transmitted simultaneously, differing only with regard to the code. This interference may occur when base station 1 is in wireless contact simultaneously with multiple slave stations 5, 6 (which is the usual case with modern mobile telephone systems). This type of interference is caused by the signals of different users, and is referred to as MAI (multiple access interference).

MAI and ISI may be eliminated by predistortion using one or more filters in the base station.

For exemplary purposes only, the reception in first slave station 5 of signals transmitted from base station 1 is described below. First slave station 5 includes a transceiver circuit 50, to which second antenna 105 is connected as the transmitting/receiving antenna. The first slave station may receive downlink data streams in the wireless cell of base station 1 over second antenna 105, for example, via first wireless channel 10. The transceiver circuit 50 relays the signals received over this downlink wireless channel from base station 1 to a demultiplexer 90, which separates the data signals from the reference signals in various blocks 70, 75, 80 of respective bursts 120, starting with the received signals on the basis of the known burst structure, as shown in FIG. 3. The reference signals received in this manner, which may be provided for multiple slave stations, are sent to a first correlation receiver 20, where they are correlated with the reference signal preselected for first slave station 5.

A synchronizing device 95 is connected downstream from first correlation receiver 20. This synchronizing device 95 synchronizes the data signals separated by demultiplexer 90 from the result of the correlation in a data processing unit 115 for the extracted data signals downstream from demultiplexer 90. For this purpose, the synchronizing device 95 selects, as the synchronization time, a point in time of the greatest correlation value determined by the first correlation receiver, since, at this point in time, the highest correlation prevails between the received reference signals and the reference signal preselected for first slave station 5. The result of this correlation is shown in FIG. 4, in which power P of individual components $\hat{h}_i, \hat{h}_j$ determined in correlation is plotted over time t. At a time $t_2$, the largest correlation value $$|\hat{h}_i|^2 > \max_{j \neq i}\left(|\hat{h}_j|^2\right)$$

is determined, so that time $t_2$ is selected as the synchronization time.

Accordingly, synchronizing device 95 adjusts the phase of the received data signals in data processing unit 115 to the phase of the largest correlation value determined at time $t_2$.

First correlation receiver 20 performs a channel estimate of first wireless channel 10 from the received reference signals. The channel estimate may also be performed by comparison of the received reference signals with the reference signal preselected for first slave station 5 by correlation, with components $\hat{h}_i, \hat{h}_j$ of the channel estimate, as shown in FIG. 4, being obtained as described above. Then, an analyzer device 65, which is connected downstream from first correlation receiver 20, checks whether predetermined power value $$c_{crit} \cdot \max_{j \neq i}\left(|\hat{h}_j|^2\right)$$

is exceeded within a predetermined period of time 125 in one path i of first wireless channel 10, using the channel estimate, in which $c_{crit}$ is a critical factor to be defined. If exceeded, one-way reception is determined in analyzing device 65. Otherwise, multi-way reception is determined. In the exemplary embodiment according to the present invention described with reference to FIG. 4, predetermined power value $$c_{crit} \cdot \max_{j \neq i}\left(|\hat{h}_j|^2\right)$$

is exceeded only at point in time $t_2$, within predetermined period of time 125, so that one-way reception is assumed.

Predetermined period of time 125 is selected to be on the order of magnitude of the maximum difference in lag of the channel paths of a time slot. If predetermined period of time 125 is too short, false detection of one-way reception may occur, and if period of time 125 is too long, false detection of multi-way reception may occur.

First slave station 5 also includes a first detector 55 for implementing a method for distortion and despreading of received data signals. For this purpose, a joint detection method may be used, for example, or a RAKE receiver may be used. First detector 55 is connectable via a first controllable switch 130 to the output of data processing unit 115.

First slave station 5 also includes a second detector 60 for implementing a method for data detection by despreading the received data signals. For this purpose, a second correlation receiver, for example, may be used. Second detector 60 is connectable via first controllable switch 130 to the output of data processing unit 115 as an alternative to being connected to first detector 55.

First detector 55 or second detector 60 is optionally connectable via a second controllable switch 135 to a data output 140, which sends the detected data for further processing.

Both controllable switches 130, 135 are controlled by analyzer device 65. The method of distortion and despreading to be implemented by first detector 55 requires, at least for the distortion process, the channel estimate of the transmission properties of first wireless channel 10, which is delivered by first correlation receiver 20 to first detector 55.

Analyzer device 65 controls both controllable switches 130, 135, so that they connect first detector 55 to data processing unit 115 and data output 140 when multi-way reception is detected. When one-way reception is detected, analyzer device 65 controls both controllable switches 130, 135, so that they connect second detector 60 to data processing unit 115 and data output 140.

For the despreading by first detector 55 or second detector 60, the code information assigned to first slave station 5 is stored in first slave station 5 and sent to the two detectors (not shown in FIG. 1).

For the uplink transmission, first slave station 5 includes another data source 145, from which data signals and optional reference signals are transmitted to base station 1 over transceiver circuit 50 and second antenna 105. On the basis of the reference signals transmitted in the uplink, channel estimator 25 may estimate the wireless channel in the uplink (not shown in FIG. 1), for example, by correlation reception. The channel estimator 25 may then use this estimate for the predistortion in filter 15, as described above.

Due to the predistortion with filter 15, filter 15 may be considered together with first wireless channel 10 as a transmission channel, and a total pulse response may be estimated for this transmission channel in the first slave station. This permits first slave station 5 to distort the data signals transmitted over this transmission channel. When distorting the data signals, first slave station 5 may consider faulty predistortion by filter 15, which may occur, for example, when the properties of first wireless channel 10 rapidly change. For example, a similarly rapid movement of first slave station 5 relative to base station 1 may cause the estimate of the transmission properties of first wireless channel 10 to be no longer up-to-date, due to the determination of the transmission properties in the uplink at the time of the following transmission over first wireless channel 10. Distortion in first slave station 5 eliminates the MAI and ISI, which may be present due to faulty predistortion.

Filter 15 should have constant coefficients for duration 85 of a burst 120, to consider the predistortion in distortion, although these coefficients may change from one burst to the next as a function of the channel estimate in the uplink via channel estimator 25.

In first slave station 5, first wireless channel 10 is estimated with the help of the respective predistorted reference signal detected by first correlation receiver 20, as described above. The estimate describes first wireless channel 10, as well as the combination of first wireless channel 10 and filter 15. In addition, this estimate also considers the RF processing, which includes, in base station 1, a transceiver device 45 having an RF filter, a power amplifier and wiring, and includes, in first slave station 5, a transceiver circuit 50 having an RF filter, an amplifier, an IF filter, a baseband filter and wiring. FIG. 1 does not show the RF filter, IF filter, baseband filter, amplifier or wiring.

It is believed that this has the advantage in that all of the functions of first slave station 5 based on the channel estimate, for example, the synchronization of first slave station 5 to base station 1 by using a reference signal, may be retained in comparison with a system without predistortion. A system having filter predistortion is equivalent to a system without predistortion, in which first wireless channel 10 is expanded by filter 15. This may yield the following advantages, for example.

Despite predistortion, distorting methods, such as JD (joint detection) methods or a RAKE receiver, may also be used for detection. Since predistortion is fully considered in the receiver channel estimate, it is automatically considered by such a distorting method that uses the total channel estimate.

Synchronization mechanisms based on reference signals may also be used with no change. The change in synchronization required, due to predistortion, in comparison with a system without predistortion, is automatically considered via the reference signals, which are altered by predistortion.

The RF transmission properties of base station 1 and the first slave station are also contained in the channel estimates of the first slave station. The RF transmission properties in the reverse path in the uplink are contained in filter 15, which is also estimated by channel estimator 25. The RF transmission properties in the forward path in the downlink are estimated directly in first slave station 5. Differences in transit time due to differences in RF transmission properties in the forward and reverse paths are automatically considered by synchronization based on reference signals.

Through transmission of reference signals from base station 1 to first slave station 5, first slave station 5 may be synchronized to the transmission of the signals intended for first slave station 5, in which case the properties of the reverse channel in the uplink are also considered for the synchronization, which may result in phase rotation through predistortion of the reference signals in base station 1.

Base station 1 may not need to signal on the data detection to be used in first slave station 5, due to the check in first slave station 5 for multi-way reception and the choice of the type of detection.

Additionally or alternatively, slave station 5, 6 may be provided with predistortion with filtering for the transmission in the uplink and a data detection, as described above, and, in a corresponding manner, be provided in base station 1 for detection of data transmitted in uplink.

The multichannel transmission method described above between base station 1 and slave stations 5, 6 (referred to below as users) is described below by mathematical equations, in which the transmission properties of wireless channels responsible for ISI and the codes of wireless channels responsible for MAI are considered. These equations may be implemented in a corresponding software program or in corresponding hardware modules.

FIG. 2 shows a time sequence in TDD operation having predistortion. At a first step 200, first slave station 5 sends reference signals for estimation of the transmission properties of first wireless channel 10 to base station 1. This channel estimate is performed in a second step 205, after receiving the reference signals in base station 1. Then, spreading is performed in modulator 30, and filter 15 predistorts the signals to be transmitted to first slave station 5 in a third step 210. The predistorted signals are then received by first slave station 5 in a fourth step 215 and are either despread or distorted and despread after analyzing device 65 checks the signals.

FIG. 1 shows base station 1 forming a channel estimate in the reverse path and for sending the predistorted signals as described above. FIG. 2 shows steps of the process over time, as described above.

An exemplary algorithm for calculating the predistorted filters is described below. This description applies to the baseband, i.e., it is discrete. Data is transmitted in blocks. If $\underline{d}^{(k)} = (d^{(k)}_1, \ldots, d^{(k)}_M)$, $k=1, \ldots, K$ is the vector of M data symbols of the k-th user to be transmitted. With the CDMA code $\underline{c}^{(k)} = (c^{(k)}_1, \ldots, c^{(k)}_Q)$, $k=1, \ldots, K$ and the matrices $$C^{(k)} = \underbrace{\begin{pmatrix} \underline{c}^{(k)T} & 0 & 0 \\ 0 & \ddots & 0 \\ 0 & 0 & \underline{c}^{(k)T} \end{pmatrix}}_{M} \Bigg\} M \cdot Q, k = 1, \ldots, K$$

$\underline{c}^{(k)T}$ = transposed vector $\underline{c}^{(k)}$, the CDMA-coded data signal of the k-th user $\underline{x}^{(k)T}$ may be written as $$\underline{x}^{(k)T} = C^{(k)} \cdot \underline{d}^{(k)T}$$

These signals are filtered linearly after modulation in filter 15 or in the filters for individual slave stations 5, 6 or users. The filter coefficients may be $p_v^{(k)}$ {fourth root}$v=1, \ldots, V$, in which V is the filter length to be defined. The filtering may be written in matrix notation as follows:

$$X^{(k)} \cdot \underline{p}^{(k)T},$$

in which $$X^{(k)} = \begin{pmatrix} x_1^{(k)} & 0 & 0 \\ \vdots & \ddots & x_1^{(k)} \\ x_{M \cdot Q}^{(k)} & \ddots & \vdots \\ 0 & 0 & x_{M \cdot Q}^{(k)} \end{pmatrix} \Bigg\} M \cdot Q + V - 1$$

The filtered signals are summed to $$D \cdot X \cdot \underline{p}^T$$

in which $$D = \begin{pmatrix} 1 & 0 & 0 & 1 & 0 & 0 & \ldots \\ 0 & \ddots & 0 & 0 & \ddots & 0 & \ldots \\ 0 & 0 & 1 & 0 & 0 & 1 & \ldots \end{pmatrix} \Bigg\} M \cdot Q + V - 1$$

$$X = \begin{pmatrix} X^{(1)} & 0 & 0 \\ 0 & \ddots & 0 \\ 0 & 0 & X^{(K)} \end{pmatrix}$$

$$\underline{p} = (\underline{p}^{(1)}, \ldots, \underline{p}^{(K)})$$

General predistortion of the spread signals may be written as:

$$D \cdot P \cdot C \cdot \underline{d}^T,$$

in which P represents a predistortion matrix. The linear filtering described above corresponds to this notation with $$p = \begin{pmatrix} p^{(1)} & 0 & 0 \\ 0 & \ddots & 0 \\ 0 & 0 & p^{(K)} \end{pmatrix} \text{ and }$$

$$p^{(K)} = \begin{pmatrix} p_1^{(K)} & 0 & 0 \\ \vdots & \ddots & 0 \\ p_V^{(K)} & & p_1^{(K)} \\ 0 & \ddots & \vdots \\ 0 & 0 & p_V^{(K)} \end{pmatrix}$$

The structure of predistortion matrix P is selected so that it corresponds to linear filtering. Thus, the coefficients $p_1^{(k)}, \ldots, p_V^{(k)}$ of predistortion matrix P remain constant during a burst 120 in accordance with the above matrix presentation. Then, this summed signal is transmitted via multi-way channels to slave stations 5, 6. With pulse responses $\underline{h}^{(k)} = (h_1^{(k)}, \ldots, h_1^{(k)})$ (W=channel length), additive noise $\underline{n}^{(k)} = (n^{(k)}_1, \ldots, n^{(k)}_{M \cdot Q + W - 1})$, k=1, ..., K of the various user transmission channels and the convolution matrices $$H^{(k)} = \begin{pmatrix} h_1^{(k)} & 0 & 0 \\ \vdots & \ddots & 0 \\ h_W^{(k)} & \vdots & h_1^{(k)} \\ 0 & \ddots & \vdots \\ 0 & 0 & h_W^{(k)} \end{pmatrix} \Bigg\} M \cdot Q + 2 \cdot V - 2$$

the k-th user of the system thus receives the signal $$\underline{s}^{(k)T} = H^{(k)} \cdot D \cdot X \cdot \underline{p}^T + \underline{n}^{(k)T}.$$

Second correlation receiver 60, which may be a code-matched filter receiver, e.g., a one-finger RAKE receiver, demodulates the data signals received using k-th user code $\underline{c}^{(k)}$ assigned to the first slave station as follows:

$$\underline{d}^{(k)T} = R^{(k)H} \cdot \underline{s}^{(k)T},$$

in which $R^{(k)H}$ conjugated transposed matrix $R^{(k)}$ and $$R^{(k)} = \begin{pmatrix} 0 & 0 & 0 \\ \vdots & \vdots & \vdots \\ 0 & & \\ \underline{c}^{(k)T} & 0 & \\ 0 & \ddots & 0 \\ 0 & 0 & \underline{c}^{(k)T} \end{pmatrix} \Bigg\} M \cdot Q + 2 \cdot V - 2$$

With the combinations $$R = \begin{pmatrix} R^{(1)} & 0 & 0 \\ 0 & \ddots & 0 \\ 0 & 0 & R^{(K)} \end{pmatrix}$$

$$H = \begin{pmatrix} H^{(1)} & 0 & 0 \\ 0 & \ddots & 0 \\ 0 & 0 & H^{(K)} \end{pmatrix}$$

$$\underline{n} = (\underline{n}^{(1)}, \ldots, \underline{n}^{(K)})$$

and multiplication matrix $D^T$, the following is obtained as the total vector of all demodulated signals:

$$\underline{d} = R^H \cdot H \cdot D^T \cdot D \cdot X \cdot \underline{p}^T + R^H \cdot \underline{n}^T$$

Thus, It follows that the deviation from $\underline{\hat{d}}$ to $\underline{d}$ is minimal when the following pseudoinversion method is selected for $\underline{p}$:

$$\underline{p}^T = (R^H \cdot H \cdot D^T \cdot D \cdot X)^1 \cdot \underline{d}^T$$

$M^1$ denotes the pseudoinverse of matrix M.

Transmission signal $D \cdot X \cdot \underline{p}^T$ is lengthened by V-1 components in comparison with signal $\Sigma_{k=1}^K \underline{x}^{(k)}$, which has not been predistorted. To prevent interference in successive bursts, only the signal that has been shortened by V-1 components may be transmitted.

When analyzer device 65 contains only one transmission path of a significant power on the basis of the channel estimate in first slave station 5, second correlation receiver 60 is used in the form of a code-matched filter, for example (for data detection as described above), which demodulates the received data signals according to the equation $$\underline{d}^{(k)T} = R^{(k)H} \cdot \underline{s}^{(k)T}$$

However, when analyzer device 65 contains more than one transmission path of a significant power, a distortion method using first detector 55, e.g., a JD method or a RAKE receiver, may be used for detection. This permits data reception in the case of faulty predistortion, such as that which may occur, for example, at high speeds, since the channel estimate made in the reverse path may no longer match first wireless channel 10 of the forward path, which is used at a later point in time. As described above, the following conditions may be stipulated according to FIG. 4 as the criterion for the path of a significant power:

There is an i such that $$|\hat{h}_i|^2 \geq c_{crit} \cdot \max_{j \neq i} \left( |\hat{h}_j|^2 \right),$$

where $0 < c_{crit} < 1$ is the critical factor to be defined, and $\hat{h}_j$ denotes the j-th component of the channel estimate.

On the basis of the estimated channel pulse response, analyzing device 65 in first slave station 5 decides whether the MAI is eliminated by predistortion in base station 1 alone or additionally by distortion in first slave station 5. Thus, this need not be signaled to first slave station 5.

Elimination of ISI and MAI in filter 15 of base station 1 is also referred to as joint predistortion JP.

The term distortion is generally understood to refer to a measure in the corresponding slave station that considers multi-way reception for detection of data signals, whether by using a JD (joint detection) method or by using a RAKE receiver, which receives each data signal received over multiple paths of first wireless channel 10 in a separate RAKE path and sums the separately received data signals of the individual paths of first wireless channel 10 so that a diversity reception results.

The invention claimed is:

1. A method of transmitting data signals between a master station and a plurality of slave stations over wireless channels, the method comprising:
   spreading, in the master station, the data signals for different ones of the slave stations using different codes;
   predistorting the data signals to be transmitted, wherein transmission properties of the wireless channels and the different codes are considered in the predistorting, and the predistorting is performed by filtering the data signals in the master station;
   wherein reference signals are transmitted to the plurality of slave stations with at least a portion of the data signals, and the reference signals are predistorted by filtering in the same manner as the data signals before being transmitted.

2. The method of claim 1, wherein the filtering is performed using a linear filter.

3. The method of claim 1, wherein the data signals are filtered differently for different ones of the slave stations.

4. The method of claim 1, wherein the data signals and the reference signals are jointly predistorted.

5. The method of claim 1, wherein the data signals and the reference signals are transmitted in separate blocks of a burst.

6. The method of claim 5, wherein the predistortion is performed block by block, so that the blocks of the burst are predistorted separately.

7. The method of claim 5, wherein the predistortion is performed burst by burst, so that the blocks of the burst are predistorted contiguously.

8. The method of claim 1, wherein a separate one of the reference signals is transmitted for a first one of the slave stations.

9. The method of claim 1, wherein at least some of the data signals are shortened by at least one component after being filtered and before being transmitted.

10. The method of claim 1, wherein the reference signals are received by the first one of the slave stations, a correlation receiver of the first one of the slave stations correlating the reference signals with a preselected one of the reference signals assigned to the first one of the slave stations.

11. The method of claim 10, wherein a point in time of a greatest correlation value is used as a synchronization time for synchronizing the data signals transmitted for the first one of the slave stations.

12. The method of claim 11, wherein a phase of the received data signals is adapted to a phase of the greatest correlation value.

13. The method of claim 8, wherein a channel estimate of one of the wireless channels from the master station to the first one of the slave stations is derived from the reference signals received in the first one of the slave stations.

14. The method of claim 13, wherein the channel estimate is derived by a correlation by comparing the received reference signals to a preselected one of the reference signals assigned to the first one of the slave stations.

15. The method of claim 13, wherein a method of data detection is selected as a function of the channel estimate in the first one of the slave stations.

16. The method of claim 15, wherein the first one of the slave stations determines whether the data signals have been received over multiple paths, the first one of the slave stations distorting and despreading the received data signals if the first one of the slave stations determines that the data signals have been received over multiple paths, the first one of the slave stations despreading the received data signals if the first one of the slave stations determines that the data signals have not been received over multiple paths.

17. The method of claim 16, wherein the distorting and despreading of the received data signals is performed as a function of a channel estimate, and the channel estimate is performed using the received reference signals.

18. The method of claim 16, wherein one-way reception is detected if a predetermined power value is exceeded within a predetermined period of time in one path i of the one wireless channel from the master station to a corresponding one of the slave stations, and multi-way reception is detected if the predetermined power value is not exceeded within the predetermined period of time.

19. A master station for transmitting data signals to a plurality of slave stations via wireless channels, comprising:
   a code generator;
   a modulator for spreading the data signals on the basis of code information provided by the code generator, the data signals for different ones of the slave stations being spread using different codes;

a channel estimator for providing a channel estimate;
a filter for performing a predistortion on the basis of the code information provided by the code generator and the channel estimate provided by the channel estimator; and
a reference signal generator for generating at least one reference signal for at least one of the slave stations, wherein the at least one reference signal is filtered in the same manner as the data signals to be transmitted to the at least one of the slave stations, and wherein the reference signal and the data signals are transmitted to the at least one of the slave stations.

20. The master station of claim 19, wherein the filter includes a linear filter.

21. The master station of claim 19, further comprising:
a separate filter for each slave station.

22. The master station of claim 19, wherein the filter jointly predistorts the data signals and the at least one reference signal.

23. The master station of claim 19, further comprising:
a transmitting device for transmitting the data signals and the at least one reference signal in separate blocks of a burst.

24. The master station of claim 23, wherein the filter performs the predistortion block by blocks, so that the blocks of the burst are predistorted separately.

25. The master station of claim 23, wherein the filter performs the predistortion burst by burst, so that the blocks of the burst are predistorted contiguously.

26. The master station of claim 19, wherein the reference signal generator inserts a separate reference signal for a first one of the slave stations.

27. The master station of claim 23, wherein the transmitting device of the master station shortens at least a portion of the data signals by one component, subsequent to the predistortion performed by the filter and prior to transmission.

28. A slave station, comprising:
a receiver circuit for receiving coded data signals from a master station, the data signals being predistorted by filtering in the master station, the master station considering transmission properties of wireless channels and different codes when predistorting the data signals;
a detection arrangement for detecting the data signals by despreading using a code assigned to the slave station, wherein the detection arrangement includes a first detector for distorting and despreading the received data signals; and
an analyzer device for determining whether the data signals have been received via multiple paths on the basis of the received signals predistorted by filtering in the master station, the analyzer device connecting a receiver circuit to the first detector if the analyzer device determines that the data signals have been received via multiple paths, the analyzer device connecting the receiver circuit to a second detector of the detection arrangement if the analyzer device determines that the data signals have not been received via multiple paths, wherein the second detector detects the data signals by despreading.

29. The slave station of claim 28, further comprising:
a demultiplexer for separating the data signals and reference signals from a received data stream.

30. The slave station of claim 29, further comprising:
a first correlation receiver for correlating the received reference signals with a preselected one of the reference signals for the slave station, after demultiplexing.

31. The slave station of claim 30, further comprising:
a synchronization device for selecting a point in time of a greatest correlation value as a synchronization time for synchronizing the data signals transmitted for the slave station.

32. The slave station of claim 30, wherein the synchronization device adapts a phase of the received data signals to a phase of the greatest correlation value.

33. The slave station of claim 30, wherein the first correlation receiver derives a channel estimate of a wireless channel from the master station to the slave station from the reference signals received in the slave station.

34. The slave station of claim 33, wherein the first correlation receiver determines the channel estimate by comparing the received reference signals to the preselected one of the reference signals using correlation.

35. The slave station of claim 28, wherein the analyzer device determines whether the data signals have been received via multiple paths on the basis of a channel estimate of the wireless channels from the master station to the slave station.

36. The slave station of claim 35, wherein the data signals are distorted by the channel estimate in the first detector.

37. The slave station of claim 28, wherein the analyzer device detects one-way reception if a predetermined power value is exceeded within a predetermined period of time in one path of one of wireless channel from the master station to the slave stations, and the analyzer device detects multi-way reception if the predetermined power value is not exceeded within the predetermined period of time.

38. The method of claim 16, wherein the distorting and despreading of the received data signals is performed by one of a RAKE receiver and a joint detection method, if the first one of the slave stations determines that the data signals have been received over multiple paths.

39. The slave station of claim 28, wherein the master station predistorts the data signals using a linear filter.

40. The slave station of claim 28, wherein the first detector distorts and despreads the received data signals by using one of a RAKE receiver and a joint detection method.

41. The slave station of claim 28, wherein the second detector includes a correlation receiver.

42. The slave station of claim 35, wherein the estimate of wireless channels from the master station to the slave station is performed by analyzing one of the reference signals transmitted on one of the wireless channels.

* * * * *

UNITED STATES PATENT AND TRADEMARK OFFICE
CERTIFICATE OF CORRECTION

PATENT NO. : 7,280,583 B1  Page 1 of 2
APPLICATION NO. : 10/168587
DATED : October 9, 2007
INVENTOR(S) : Frank Kowalewski et al.

It is certified that error appears in the above-identified patent and that said Letters Patent is hereby corrected as shown below:

Column 8, line 53-60, change

" $C^{(k)} = \begin{pmatrix} c^{(k)^T} & 0 & 0 \\ 0 & \ddots & 0 \\ 0 & 0 & c^{(k)^T} \end{pmatrix} \underbrace{\phantom{xxx}}_{M} \} M \cdot Q, k = 1, \ldots, K$ " to -- $C^{(k)} = \begin{pmatrix} \underline{c}^{(k)^T} & 0 & 0 \\ 0 & \ddots & 0 \\ 0 & 0 & \underline{c}^{(k)^T} \end{pmatrix} \underbrace{\phantom{xxx}}_{M} \} M \cdot Q, k = 1, \ldots, K$ --

Column 9, line 5-15, change

" $X^{(k)} = \begin{pmatrix} x_1^{(k)} & 0 & 0 \\ \vdots & \ddots & x_1^{(k)} \\ x_{M \cdot Q}^{(k)} & \ddots & \vdots \\ 0 & 0 & x_{M \cdot Q}^{(k)} \end{pmatrix} \underbrace{\phantom{xxx}}_{V} \} M \cdot Q + V - 1$ " to -- $X^{(k)} = \begin{pmatrix} x_1^{(k)} & 0 & 0 \\ \vdots & \ddots & x_1^{(k)} \\ x_{M \cdot Q}^{(k)} & \ddots & \vdots \\ 0 & 0 & x_{M \cdot Q}^{(k)} \end{pmatrix} \underbrace{\phantom{xxx}}_{V} \} M \cdot Q + V - 1$ --

Column 9, line 22-27, change

" $D = \begin{pmatrix} 1 & 0 & 0 & 1 & 0 & 0 & \cdots \\ 0 & \ddots & 0 & 0 & \ddots & 0 & \cdots \\ 0 & 0 & 1 & 0 & 0 & 1 & \cdots \end{pmatrix} \underbrace{\phantom{xxxxx}}_{(M \cdot Q + V - 1)K} \} M \cdot Q + V - 1$ " to -- $D = \begin{pmatrix} 1 & 0 & 0 & 1 & 0 & 0 & \cdots \\ 0 & \ddots & 0 & 0 & \ddots & 0 & \cdots \\ 0 & 0 & 1 & 0 & 0 & 1 & \cdots \end{pmatrix} \underbrace{\phantom{xxxxx}}_{(M \cdot Q + V - 1)K} \} M \cdot Q + V - 1$ --

Signed and Sealed this

Fifth Day of October, 2010

David J. Kappos
*Director of the United States Patent and Trademark Office*

CERTIFICATE OF CORRECTION (continued)
U.S. Pat. No. 7,280,583 B1

Column 10, line 2-10, change

"$$H^{(k)} = \begin{pmatrix} h_1^{(k)} & 0 & 0 \\ \vdots & \ddots & 0 \\ h_W^{(k)} & \vdots & h_1^{(k)} \\ 0 & \ddots & \vdots \\ 0 & 0 & h_W^{(k)} \end{pmatrix} \underbrace{\phantom{xxxx}}_{M \cdot Q + V - 1} \} M \cdot Q + 2 \cdot V - 2$$" to --
$$H^{(k)} = \begin{pmatrix} h^{(k)}{}_1 & 0 & 0 \\ \vdots & \ddots & 0 \\ h^{(k)}{}_W & \vdots & h^{(k)}{}_1 \\ 0 & \ddots & \vdots \\ 0 & 0 & h^{(k)}{}_W \end{pmatrix} \underbrace{\phantom{xxxx}}_{M \cdot Q + V - 1} \} M \cdot Q + 2 \cdot V - 2$$ --

Column 10, line 24-34, change

"$$R^{(k)} = \begin{pmatrix} 0 & 0 & 0 \\ \vdots & \vdots & \vdots \\ 0 & & \\ c^{(k)T} & 0 & \\ 0 & \ddots & 0 \\ 0 & 0 & c^{(k)T} \end{pmatrix} \underbrace{\phantom{xxx}}_{M} \} M \cdot Q + 2 \cdot V - 2$$" to --
$$R^{(k)} = \begin{pmatrix} 0 & 0 & 0 \\ \vdots & \vdots & \vdots \\ 0 & & \\ \underline{c}^{(k)T} & 0 & \\ 0 & \ddots & 0 \\ 0 & 0 & \underline{c}^{(k)T} \end{pmatrix} \underbrace{\phantom{xxx}}_{M} \} M \cdot Q + 2 \cdot V - 2$$ --

Column 10, line 60, change "$\Sigma_{k=1}^{K} \underline{x}^{(k)}$" to -- $\sum_{k=1}^{K} \underline{x}^{(k)}$ --

Column 12, line 14, change "The method of claim 1" to -- The method of claim 9 --